United States Patent

[11] 3,630,772

[72] Inventor Bernhard Seidel
Gruenwald;
Hans-Heinrich Credner, Munich, both of Germany

[21] Appl. No. 842,336
[22] Filed July 16, 1969
[45] Patented Dec. 28, 1971
[73] Assignees Agfa-Gevaert Aktiengesellschaft
Leverkusen, Germany
[32] Priority July 20, 1968
[33] Germany
[31] P 17 74 584.5

[54] MAGNETIC MEMORY FILM
9 Claims, No Drawings

[52] U.S. Cl. .......... 117/235, 252/62.54
[51] Int. Cl. .......... H01f 10/02
[50] Field of Search .......... 117/235, 236, 237, 239; 252/62.54

[56] References Cited

UNITED STATES PATENTS

| | | | |
|---|---|---|---|
| 3,247,017 | 4/1966 | Eichler et al. | 117/235 |
| 3,274,111 | 9/1966 | Sada et al. | 252/62.54 |

*Primary Examiner*—William D. Martin
*Assistant Examiner*—Bernard D. Pianalto
*Attorney*—Michael S. Striker

ABSTRACT: A lubricant is incorporated in the coating of a magnetic memory film which contains a neutral ester of a 2–20 carbon dicarboxylic acid with an aliphatic, monofunctional alcohol having 4–18 carbon atoms.

The lubricant increases the stability of still pictures recorded on the film, in particular in case of scanning with mumetal heads.

MAGNETIC MEMORY FILM

BACKGROUND OF THE INVENTION

The invention relates to a magnetic memory film with improved antifriction properties.

When recording high frequencies, particularly for the production of a video signal, the playback head of a video set in the conventional processes moves on a spiral path at a small angle to the direction of movement of the tape. The tape is held in a fixed position when a still picture is to be reproduced, as is done for educational purposes or for X-ray still pictures, while the magnet head rotates so that a steady reproduction of the individual still picture is effected.

When recording and reproducing video signals the magnet head moves with high speed relative to the tape and there is therefore a continuous close contact necessary between the playback head and the magnet tape. Minor deviations in the distance result in substantial deterioration of the picture quality. It is also necessary that the magnet head, when scanning a still picture, does not damage the tape coating since the memory for high frequencies preferably is stored in the top layers of the coating.

The presently used video sets normally employ playback heads of a ferrite material. Magnet films that contain silicones as lubricants result frequently in a deterioration of the function of the device in view of the insufficient compatibility with the binding agents and due to diffusion from the coating. Tapes with the conventional lubricants, such as graphite or fatty acid esters of monocarboxylic acids and alcohols, satisfy the required high stability of a still picture when the scanning is done with ferrite heads but not in case of sets where the scanning is done with mumetal heads, as they are used frequently in more recent times for X-ray still pictures.

It is therefore an object of the invention to provide for a lubricant incorporated in the coating which will assure the stability of the still pictures, not only when scanning with ferrite heads but also when scanning with mumetal heads.

SUMMARY OF THE INVENTION

The object of the invention is met by a magnetizable memory film of high abrasion resistance which comprises a base and a coating applied to said base, the coating containing a magnetizable pigment and binding agent and a lubricant, the latter being composed of or containing an effective amount of a neutral diester formed by a dicarboxylic acid of two to 20 carbon atoms with an aliphatic monofunctional alcohol of four to 18 carbon atoms. DESCRIPTION OF THE PREFERRED EMBODIMENTS The diesters of the invention are preferably formed of a dicarboxylic acids having four to 10 carbon atoms and altogether containing between 20 and 34 carbon atoms.

The carboxylic acids which can be used in the context of the invention are for instance succinic acid, adipic acid, azelaic, suberic acid, etc.

Examples of particular esters are for instance the ditetradecyl ester of succinic acid and the di-n-octylester of adipic acid.

The making of these esters is known from the chemical literature. They can be for instance formed by reesterification of metal esters of the dicarboxylic acids involved with corresponding higher alcohols in the presence of acids.

The esters can be used individually or as mixtures between different esters.

The amount of the lubricant of the invention can be varied over a comparatively broad range. The optimum value of a particular compound can be ascertained by simple tests. It must be kept in mind only that at the lower limit of concentration, only a minor improvement of the friction properties will be obtained while, on the other hand, at the upper limit, smudging may occur at the head because of abrasion of the coating. The preferred concentration range is generally between about 0.2 and 1.6 w/o relative to the magnetizable pigment.

The lubricants of the invention are compatible with the conventional binding agents for magnet coatings and no bleeding will occur if the dosis is properly selected. Suitable binding agents are for instance polyvinyl chloride, mixed polymers of polyvinyl chloride with polyvinyl alcohol and polyvinyl acetate, polyamides, mixed polymers between acrylonitrile and styrene with or without butadiene, polyurethanes, polyesters, polyvinylidene chloride, etc. The polymerizates can likewise be used individually or as mixtures between different polymers.

The lubricants of the invention are preferably added to the fine dispersion of the magnetizable binding agent, that is ready to be cast. A subsequent application of the lubricant which would involve a separate step is therefore not necessary.

It is within the contemplation of the present invention to add further components to the dispersion in order to improve the mechanical and electroacoustical properties of the film such as dispersing agents, for instance oleic acid, or antistatic agents, such as carbon black.

The following examples will illustrate the invention.

EXAMPLE 1

The following components were dissolved at room temperature upon stirring in the course of about 12 hours in a mixture of 16.6 l. ethylacetate and butylacetate (in the ratio of 1:1):

1.8 kg. of a partially hydrolized copolymer of vinyl chloride and vinyl acetate and a dispersing agent consisting of a mixture of a primary and secondary phosphoric acid ester with a hydrocarbon-containing polyglycol (see British Pat. 1,080,614);

0.38 kg. oleic acid;

30 g. of a lubricant according to the invention consisting of di-n-octylester of adipic acid.

To the solution there were then added 6.0 kg. of a needle-shaped $\gamma$-iron oxide and 0.32 kg. of carbon black. The mixture was subjected to stirring for another 12 hours.

The mass was then subjected to grinding in a sand mill for about 24 hours with subsequent filtration through a cellulose hardness filter having a pore width of about 5 $\mu$. The solution was then applied by casting to a polyester base of 25 $\mu$ and was dried at 120° C. for a few minutes and then subjected to a calendering at 70° C. on a double-slot calender. The thickness of the magnet coating was 11 $\mu$.

EXAMPLE 2

The same process was carried out as in example 1. However, the composition of the mass to be cast was as follows:

1.91 kg. of a partially hydrolized mixed polymerizate of vinyl chloride and vinyl acetate;

0.181 kg. of a mixture of primary and secondary phosphoric acid polyglycol esters;

0.34 kg. of oleic acid;

85 g. di-n-octylester of adipic acid;

0.108 kg. of ceres black;

16.6 l. of the same solvent as used in example 1.

EXAMPLE 3

The same process was used as in example 2, but the lubricant was di-n-butylester of adipic acid in an amount of 94 ml.

EXAMPLE 4

The dispersion of the binding agent contained 86 g. of didodecylester of adipic acid as the lubricant. Otherwise the same process was employed as in examples 2 and 3.

EXAMPLE 5

The process was again the same as in example 2 but the lubricant was didodecylester of succinic acid employed in the same amount as in example 2.

EXAMPLE 6

The process was the same as in example 2 but the lubricant was dicn-octylester of sebacic acid in an amount of 94 ml.

EXAMPLE 7

The same composition was used as in example 2 but instead of the adipic acid ester the same amount of oleic acid was used. This example was set up for comparison purposes only.

EXAMPLE 8

This is likewise a comparison example. The same composition was used as in example 2, but the lubricant was a monoester of a fatty acid, and more particularly 85 g. of n-butylester of stearyl acid.

The following tests illustrate the improvements obtained by the compounds of the invention. In this connection it is noted that the commercial value of a video band is determined by the permanence of the still picture. This term is intended to refer to the time interval between the initial reproduction and the final picture failure with a stationary tape. The individual specimens of the several tapes were tested on a memory film MVR 65 of Machtronics, which was provided with a mumetal head. The test was carried out by the heliocoidal method.

As appears from the following table, the permanence of the still picture is substantially improved with films formed with lubricants of the invention as particularly shown in specimens 1–5.

TABLE

| Lubricant | Permanence of still picture in minutes |
|---|---|
| Exs. 1 and 2 | >120 |
| Ex. 3 | 100 |
| Ex. 4 | >120 |
| Ex. 5 | >120 |
| Ex. 6 | >120 |
| Ex. 7 (comparison) | 30 |
| Ex. 8 (comparison) | 37 |

I claim:

1. A magnetizable memory film of high abrasion resistance for recording and reproducing high frequencies for scanning with mumetal heads, the said film comprising a base and a coating applied to said base, the coating containing a magnetizable pigment, an organic binding agent and a lubricant, the latter being composed of or containing an amount between 0.2 and 1.6 w/o relative to the magnetizable pigment, of a neutral diester formed by a dicarboxylic acid of 2 to 20 carbon atoms with an aliphatic monofunctional alcohol of four to 18 carbon atoms.

2. The magnetizable memory film of claim 1, wherein the lubricant is a diester of adipic, sebacic or succinic acid.

3. The magnetizable memory film of claim 1, wherein the lubricant is a diester containing between 20 and 34 carbon atoms formed of dicarboxylic acids having from four to 10 carbon atoms.

4. The magnetizable memory film of claim 1, wherein the lubricant is ditetradecylester of succinic acid.

5. The magnetizable memory film of claim 1, wherein the lubricant is di-n-octylester of adipic acid.

6. The magnetizable memory film of claim 1, wherein the binding agent is polyvinyl chloride, a mixed polymerizate of polyvinyl chloride with polyvinyl alcohol and polyvinyl acetate, a polyamide, a mixed polymerizate of acrylonitrile and styrene, a polyurethane, a polyester or polyvinylidene chloride.

7. The magnetizable memory film of claim 1, which in addition to the diester contains oleic acid as dispersing agent.

8. The magnetizable memory film of claim 1, which in addition to the diester contains carbon black as antistatic agent.

9. The magnetizable memory film of claim 1, wherein the binding agent is a mixed polymerizate of vinylchloride and vinyl acetate and the diester is di-n-octylester of adipic acid or di-n-butylester of adipic acid or didodecylester of adipic acid and which in addition contains a mixture of primary and secondary phosphoric acid polyglycol esters and oleic acid as dispersing agents.

* * * * *